US008098635B2

(12) United States Patent
Montojo et al.

(10) Patent No.: US 8,098,635 B2
(45) Date of Patent: *Jan. 17, 2012

(54) METHOD AND APPARATUS FOR PACKET COMMUNICATIONS IN WIRELESS SYSTEMS

(75) Inventors: Juan Montojo, San Diego, CA (US); Durga Prasad Malladi, San Diego, CA (US); Nathan Edward Tenny, Poway, CA (US); Francesco Grilli, La Jolla, CA (US); Aziz Gholmieh, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/903,136

(22) Filed: Oct. 12, 2010

(65) Prior Publication Data
US 2011/0026462 A1    Feb. 3, 2011

Related U.S. Application Data

(63) Continuation of application No. 11/499,458, filed on Aug. 4, 2006.

(60) Provisional application No. 60/711,534, filed on Aug. 26, 2005.

(51) Int. Cl.
*H04B 7/216* (2006.01)
(52) U.S. Cl. .................. 370/335; 370/329; 370/342
(58) Field of Classification Search .......... 370/328–331, 370/335, 342; 455/450–452.2
See application file for complete search history.

(56) References Cited

U.S. PATENT DOCUMENTS

| 5,239,557 A | * | 8/1993 | Dent ............................ 370/342 |
| 5,778,026 A | | 7/1998 | Zak |
| 6,377,803 B1 | * | 4/2002 | Ruohonen ..................... 455/434 |
| 6,400,960 B1 | * | 6/2002 | Dominique et al. .......... 455/522 |

(Continued)

FOREIGN PATENT DOCUMENTS
CN           1572077         1/2005
(Continued)

OTHER PUBLICATIONS

3GPP TR 25.840 v4.0.0; "3rd Generation Partnership Project; Technical Specification Group Radio Access Network; Terminal power saving features," 3GPP TR 25.840 version 4.0.0 Release 4, XP003001813 (Dec. 2003), pp. 1-30.

(Continued)

*Primary Examiner* — Sharad Rampuria
(74) *Attorney, Agent, or Firm* — Larry Moskowitz

(57) ABSTRACT

Techniques for transmitting and receiving data in an efficient manner to potentially improve capacity for a wireless network and achieve power savings for a wireless device are described. The techniques utilize a Continuous Packet Connectivity (CPC) mode comprised of multiple (e.g., two) discontinuous transmission (DTX) modes and at least one (e.g., one) discontinuous reception (DRX) mode. Each DTX mode is associated with different enabled uplink subframes usable for transmission from the wireless device to the network. Each DRX mode is associated with different enabled downlink subframes usable by the network for transmission to the wireless device. The wireless device may send signaling and/or data on the enabled uplink subframes and may receive signaling and/or data on the enabled downlink subframes. The wireless device may power down during non-enabled subframes to conserve battery power. Mechanisms to quickly transition between the DTX and DRX modes are described.

24 Claims, 13 Drawing Sheets

U.S. PATENT DOCUMENTS

| | | | |
|---|---|---|---|
| 6,654,613 | B1 | 11/2003 | Maeng et al. |
| 6,721,712 | B1 | 4/2004 | Benyassine et al. |
| 6,950,632 | B1 | 9/2005 | Yun et al. |
| 6,967,970 | B2 | 11/2005 | Terry et al. |
| 7,072,306 | B2 | 7/2006 | Blessent |
| 7,075,907 | B1 | 7/2006 | Lintulampi |
| 7,224,993 | B2 | 5/2007 | Meyers et al. |
| 7,437,172 | B2 | 10/2008 | Chen et al. |
| 7,483,386 | B2 | 1/2009 | Leonard |
| 7,564,819 | B2 | 7/2009 | Khan |
| 7,852,805 | B2 * | 12/2010 | Kahtava et al. ............... 370/329 |
| 2003/0086379 | A1 | 5/2003 | Terry et al. |
| 2003/0108013 | A1 | 6/2003 | Hwang et al. |
| 2004/0202147 | A1 | 10/2004 | Hakkinen et al. |
| 2004/0229605 | A1 | 11/2004 | Hwang et al. |
| 2007/0070944 | A1 * | 3/2007 | Rinne et al. ................... 370/329 |
| 2008/0102880 | A1 | 5/2008 | Gholmieh et al. |
| 2009/0046650 | A1 * | 2/2009 | Dalsgaard et al. ............ 370/329 |
| 2011/0002281 | A1 * | 1/2011 | Terry et al. ................... 370/329 |

FOREIGN PATENT DOCUMENTS

| | | |
|---|---|---|
| EP | 0971489 A2 | 1/2000 |
| EP | 1424796 A1 | 6/2004 |
| GB | 2406751 | 4/2005 |
| JP | 9261153 A | 10/1997 |
| JP | 11046162 A | 2/1999 |
| JP | 2005507191 T | 3/2005 |
| WO | WO9949689 A2 | 9/1999 |
| WO | WO0152566 | 7/2001 |

OTHER PUBLICATIONS

3rd Generation Partnership Project, "Technical Specification Group Radio Access Network; Multiplexing and channel coding", 3GPP TS 25.212 version 6.5.0 Release 6, (Jun. 2005), Section 4.6.

International Search Report—PCT/US06/033241—International Search Authority, European Patent Office—Jan. 31, 2007.

"Universal Mobile Telecommunications System (UMTS)," ETSI Standards, European Telecommunications Standards Institute, 3GPP TS 25.331 Version 6.5.0 Release 6, vol. 3-R2, No. V650, Mar. 2005.

Written Opinion—PCT/US06/033241—International Search Authority, European Patent Office—Jan. 31, 2007.

Ericsson, DRX in Connected mode, 3GPP TSGR2#7(99)A93, 3GPP, Sep. 20, 1999.

Ely et al., "Electromagnetic Inteference Assessment of CDMA and GSM Wireless Phones to Aircraft Navigation Radios" 21TH. DASC. The 21TH. Digital Avionics Systems Conference Proceedings. Irvine, CA, Oct. 27-31, 2002: [Digital Avionics Systems Conference], New York, NY: IEEE, US, vol. 2, Oct. 27, 2002, pp. 1055-1067, XP010616283.

European Search Report—EF10163332—Search Authority—Munich—Aug. 8, 2010.

* cited by examiner

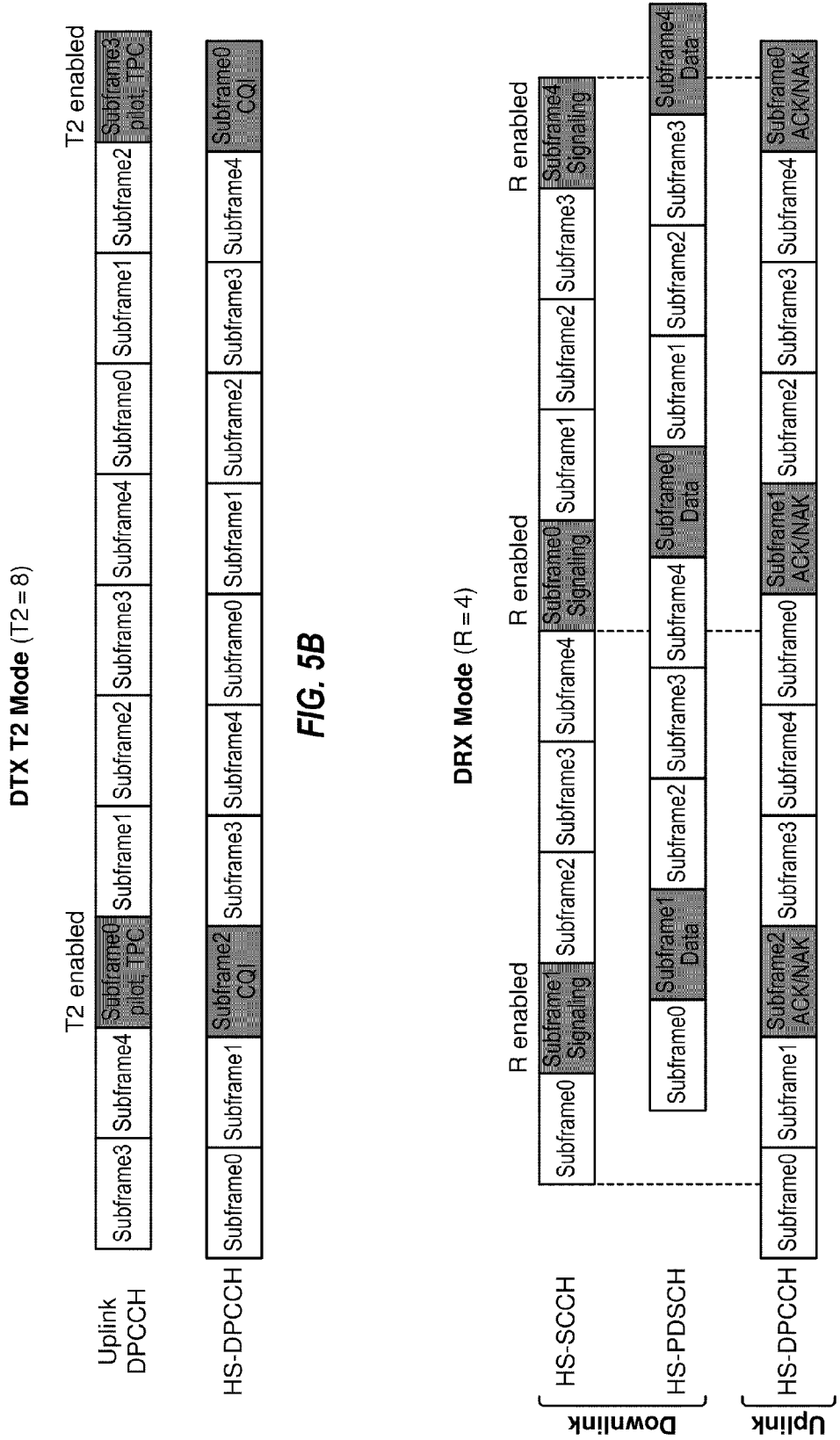

METHOD AND APPARATUS FOR PACKET COMMUNICATIONS IN WIRELESS SYSTEMS

CLAIM OF PRIORITY UNDER 35 U.S.C. §120

The present Application for Patent is a continuation of, and claims priority to U.S. patent application Ser. No. 11/499,458, entitled "METHOD AND APPARATUS FOR PACKET COMMUNICATIONS IN WIRELESS SYSTEMS," filed Aug. 4, 2006, which claims priority to Provisional Application Ser. No. 60/711,534, entitled "METHOD AND APPARATUS FOR PACKET COMMUNICATIONS IN WIRELESS SYSTEMS," filed Aug. 26, 2005, and Provisional Application Ser. No. 60/793,973, entitled "METHOD AND APPARATUS FOR PACKET COMMUNICATIONS IN WIRELESS SYSTEMS," filed Apr. 21, 2006, both assigned to the assignee hereof, and expressly incorporated herein by reference.

BACKGROUND

I. Field

The present disclosure relates generally to communication, and more specifically to techniques for transmitting and receiving data in a wireless communication network.

II. Background

A wireless device (e.g., a cellular phone) in a wireless communication network may operate in one of several operating modes, such as active and idle, at any given moment. In the active mode, the wireless device may be allocated radio resources by the network and may actively exchange data with the network, e.g., for a voice or data call. In the idle mode, the wireless device may not be allocated radio resources and may be monitoring overhead channels transmitted by the network. The wireless device may transition between the active and idle modes, as necessary, based on data requirements of the wireless device. For example, the wireless device may transition to the active mode whenever there is data to send or receive and may transition to the idle mode after completing the data exchange with the network.

The wireless device may exchange signaling with the network to transition between operating modes. The signaling consumes network resources and delays data transmission until radio resources are allocated to the wireless device. To avoid the signaling and delay, the wireless device may remain in the active mode for an extended period of time. However, extended stay in the active mode may result in a waste of the allocated radio resources when there is no data to exchange. Furthermore, operation in the active mode may consume more battery power, which may shorten standby time between battery recharges and talk time when there is data to exchange.

There is therefore a need in the art for techniques to transmit and receive data in an efficient manner.

SUMMARY

One embodiment of the invention is a wireless device comprising at least one processor to operate in one of multiple discontinuous transmission (DTX) modes or a no DTX mode, while in a connected mode, for transmission to a wireless network, and to operate in one of at least one discontinuous reception (DRX) mode or a no DRX mode, while in the connected mode, for reception from the wireless network; and a memory coupled to the at least one processor.

Another embodiment is a wireless device comprising at least one processor to operate in a connected mode for communication with a wireless network and to operate in one of multiple discontinuous transmission (DTX) modes or a no DTX mode, while in the connected mode, for transmission to a wireless network; and a memory coupled to the at least one processor.

Another embodiment is a wireless device comprising at least one processor to operate in a connected mode for communication with a wireless network and to operate in one of at least one discontinuous reception (DRX) mode or a no DRX mode, while in the connected mode, for reception from the wireless network; and a memory coupled to the at least one processor.

Another embodiment is a method comprising operating in one of multiple discontinuous transmission (DTX) modes or a no DTX mode, while in a connected mode, for transmission to a wireless network; and operating in one of at least one discontinuous reception (DRX) mode or a no DRX mode, while in the connected mode, for reception from the wireless network.

Another embodiment is an apparatus comprising means for operating in one of multiple discontinuous transmission (DTX) modes or a no DTX mode, while in a connected mode, for transmission to a wireless network; and means for operating in one of at least one discontinuous reception (DRX) mode or a no DRX mode, while in the connected mode, for reception from the wireless network.

Another embodiment is an apparatus comprising at least one processor to receive from a wireless device operating in one of multiple discontinuous transmission (DTX) modes or a no DTX mode while in a connected mode, and to transmit to the wireless device operating in one of at least one discontinuous reception (DRX) mode or a no DRX mode while in the connected mode; and a memory coupled to the at least one processor.

Another embodiment is a method comprising receiving from a wireless device operating in one of multiple discontinuous transmission (DTX) modes or a no DTX mode while in a connected mode; and transmitting to the wireless device operating in one of at least one discontinuous reception (DRX) mode or a no DRX mode while in the connected mode.

Another embodiment is an apparatus comprising means for receiving from a wireless device operating in one of multiple discontinuous transmission (DTX) modes or a no DTX mode while in a connected mode; and means for transmitting to the wireless device operating in one of at least one discontinuous reception (DRX) mode or a no DRX mode while in the connected mode.

Various aspects and embodiments of the invention are described in further detail below.

BRIEF DESCRIPTION OF THE DRAWINGS

FIGS. 5A, 5B and 5C show operation in DTX T1, DTX T2 and DRX modes, respectively.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The techniques described herein may be used for various wireless communication networks such as Code Division Multiple Access (CDMA) networks, Time Division Multiple Access (TDMA) networks, Frequency Division Multiple Access (FDMA) networks, and Orthogonal FDMA (OFDMA) networks. The terms "network" and "system" are often used interchangeably. A CDMA network may implement a radio technology such as W-CDMA, cdma2000, and so on. cdma2000 covers IS-2000, IS-856 and IS-95 standards. A TDMA network may implement a radio technology such as Global System for Mobile Communications (GSM). These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). For clarity, the techniques are described below for Universal Mobile Telecommunication System (UMTS), which utilizes W-CDMA. UMTS terminology is used in much of the description below.

Figure 1:
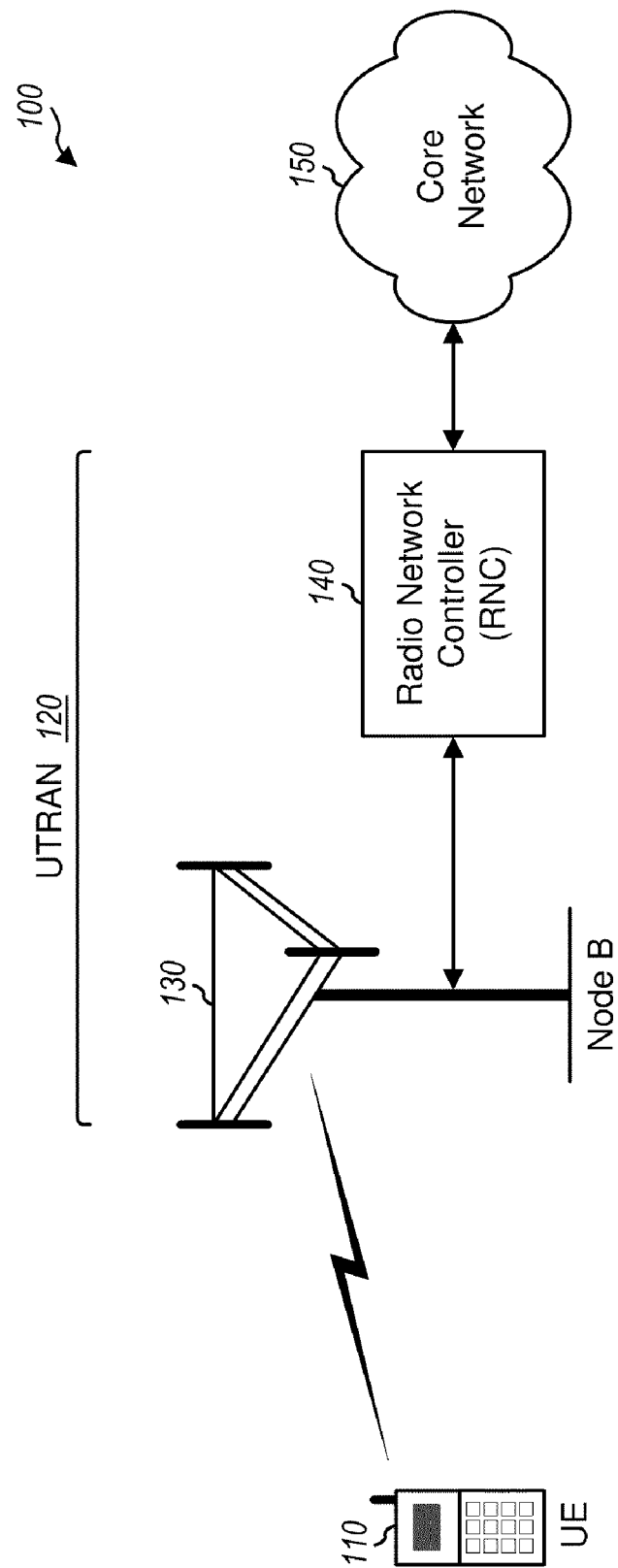
FIG. 1 shows a diagram of a 3GPP network.

FIG. 1 shows a diagram of a 3GPP/UMTS network 100 that includes a Universal Terrestrial Radio Access Network (UTRAN) 120 and a core network 150. A UE 110 communicates with a Node B 130 in UTRAN 120. UE 110 may be stationary or mobile and may also be referred to as a wireless device, a mobile station, a user terminal, a subscriber unit, a station, or some other terminology. UE 110 may be a cellular phone, a personal digital assistant (PDA), a handheld device, a wireless modem, and so on. The terms "UE", "wireless device", and "user" are used interchangeably herein. Node B 130 is generally a fixed station that communicates with the UEs and may also be referred to as a base station, an access point, or some other terminology. Node B 130 provides communication coverage for a particular geographic area and supports communication for UEs located within the coverage area. A Radio Network Controller (RNC) 140 couples to Node B 110 and provides coordination and control for the Node B. Core network 150 may include various network entities that support various functions such as packet routing, user registration, mobility management, etc.

UE 110 may communicate with Node B 130 on the downlink and/or uplink at any given moment. The downlink (or forward link) refers to the communication link from the Node B to the UE, and the uplink (or reverse link) refers to the communication link from the UE to the Node B.

In UMTS, data is processed as one or more transport channels at a higher layer. The transport channels may carry data for one or more services, e.g., voice, video, packet data, and so on. The transport channels are mapped to physical channels at a physical layer or Layer 1 (L1). The physical channels are channelized with different channelization codes and are orthogonal to one another in code domain.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively. Tables 1 and 2 list some downlink and uplink physical channels, respectively, in UMTS. The HS-SCCH, HS-PDSCH, and HS-DPCCH are used for HSDPA. The E-DPCCH, E-DPDCH, and E-HICH are used for HSUPA.

TABLE 1

Downlink Channels

| Channel | Channel Name | Description |
| --- | --- | --- |
| P-CCPCH | Primary Common Control Physical Channel | Carry pilot and system frame number (SFN). |
| Downlink DPCCH | Dedicated Physical Control Channel | Carry pilot, transport format combination indicator (TFCI) for downlink DPDCH, and transmit power control (TPC) for uplink. |
| Downlink DPDCH | Dedicated Physical Data Channel | Carry packets for the UE. |
| HS-SCCH | Shared Control Channel for HS-DSCH | Carry format information for packets sent on associated HS-PDSCH. |
| HS-PDSCH | High Speed Physical Downlink Shared Channel | Carry packets for different UEs. |
| E-HICH | E-DCH Hybrid ARQ Indicator Channel | Carry acknowledgement (ACK) and negative acknowledgement (NAK) for packets sent on E-DPDCH. |

TABLE 2

Uplink Channels

| Channel | Channel Name | Description |
| --- | --- | --- |
| Uplink DPCCH | Dedicated Physical Control Channel | Carry pilot, TFCI for uplink DPDCH, TPC for downlink, and feedback information (FBI). |
| Uplink DPDCH | Dedicated Physical Data Channel | Carry packets from the UE. |
| HS-DPCCH | Dedicated Physical Control Channel for HS-DSCH | Carry ACK/NAK for packets received on HS-PDSCH and channel quality indicator (CQI). |
| E-DPCCH | E-DCH Dedicated Physical Control Channel | Carry format information, retransmission sequence number, and happy bit for E-DPDCH. |
| E-DPDCH | E-DCH Dedicated Physical Data Channel | Carry packets from the UE. |

Figure 2:
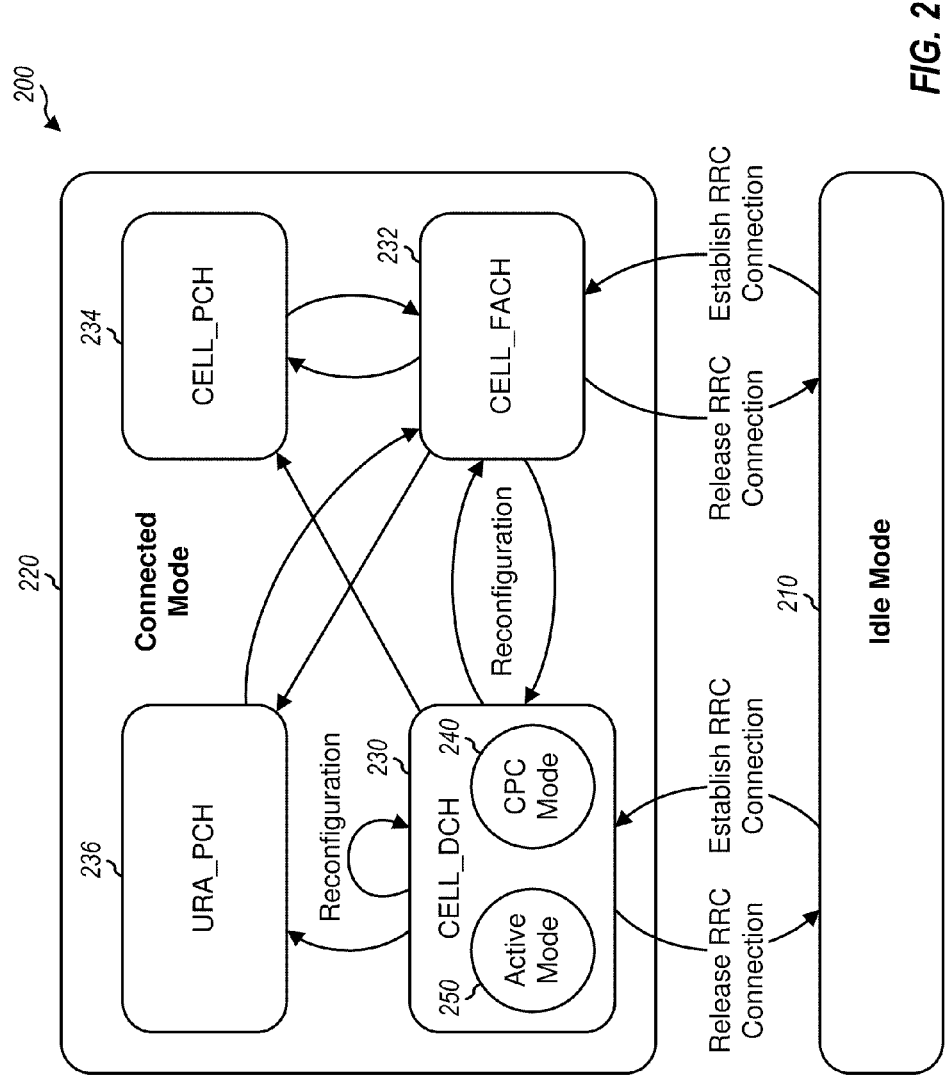
FIG. 2 shows a state diagram of Radio Resource Control (RRC) states for a User Equipment (UE).

FIG. 2 shows a state diagram 200 of the Radio Resource Control (RRC) states for the UE. Upon being powered on, the UE performs cell selection to find a suitable cell from which the UE can receive service. Thereafter, the UE may transition to an idle mode 210 or a connected mode 220 depending on whether there is any activity for the UE. In the idle mode, the UE has registered with the UTRAN, is listening for paging messages, and updates its location with the UTRAN when necessary. In the connected mode, the UE can receive and/or transmit data, depending on its RRC state and configuration. The connected mode may also be referred to as a connected state, an active mode, an active state, a traffic state, a traffic channel state, and so on.

In the connected mode, the UE may be in one of four possible RRC states—a CELL_DCH state 230, a CELL_FACH state 232, a CELL_PCH state 234, or a URA_PCH state 236. The CELL_DCH state is characterized by (1) dedicated physical channels allocated to the UE for the downlink and uplink and (2) a combination of dedicated and shared transport channels being available to the UE. The CELL_FACH state is characterized by (1) no dedicated physical channels allocated to the UE, (2) a default common or shared transport channel assigned to the UE for use to access the UTRAN, and (3) the UE continually monitoring a Forward Access Channel (FACH) for signaling such as Reconfiguration messages. The CELL_PCH and URA_PCH states are characterized by (1) no dedicated physical channels allocated to the UE, (2) the UE periodically monitoring a Paging Channel (PCH) for paging messages, and (3) the UE not being permitted to transmit on the uplink. The modes and states for the UE are described in 3GPP TS 25.331.

While in the connected mode, the UTRAN can command the UE to be in one of the four possible states based on activity of the UE. The UE may transition (1) from the CELL_DCH or CELL_FACH state in the connected mode to the idle mode by performing a Release RRC Connection procedure, (2) from the idle mode to the CELL_DCH or CELL_FACH state by performing an Establish RRC Connection procedure, (3) between the CELL_DCH and CELL_FACH states by performing a reconfiguration procedure, and (4) between different configurations in the CELL_DCH state by also performing a reconfiguration procedure. These procedures are described in 3GPP TS 25.331.

In an embodiment, the CELL_DCH state comprises a Continuous Packet Connectivity (CPC) mode 240 and an Active mode 250. The Active mode may correspond to operation of the HSDPA and HSUPA channels as described in 3GPP Release 6. In the Active mode, data may be sent in any subframe on the downlink and uplink. A subframe is a time interval in which a transmission may be sent on a link. A subframe may have different durations in different networks and/or for different configurations of a given network. The CPC mode may be used to achieve efficient data transmission and reception for the UE. The CPC mode may provide power savings for the UE and/or capacity improvement for the UTRAN.

In an embodiment, while in the CPC mode, radio resources (e.g., physical channels) are allocated and states for higher layers (e.g., Layers 2 and 3) are maintained, but only a subset of the subframes available on the downlink and uplink are enabled. The UE may send signaling and/or data on the enabled uplink subframes and may receive signaling and/or data on the enabled downlink subframes. The UE may power down certain circuit blocks and subsystems, e.g., its transmitter and/or receiver, during the non-enabled subframes to conserve battery power.

In general, the CPC mode may include any number of DTX modes, any number of DRX modes, and/or other modes. Each DTX mode may be associated with different enabled uplink subframes and/or different actions to be performed by the UE. Each DRX mode may be associated with different enabled downlink subframes and/or different actions to be performed by the UE.

Figure 3:
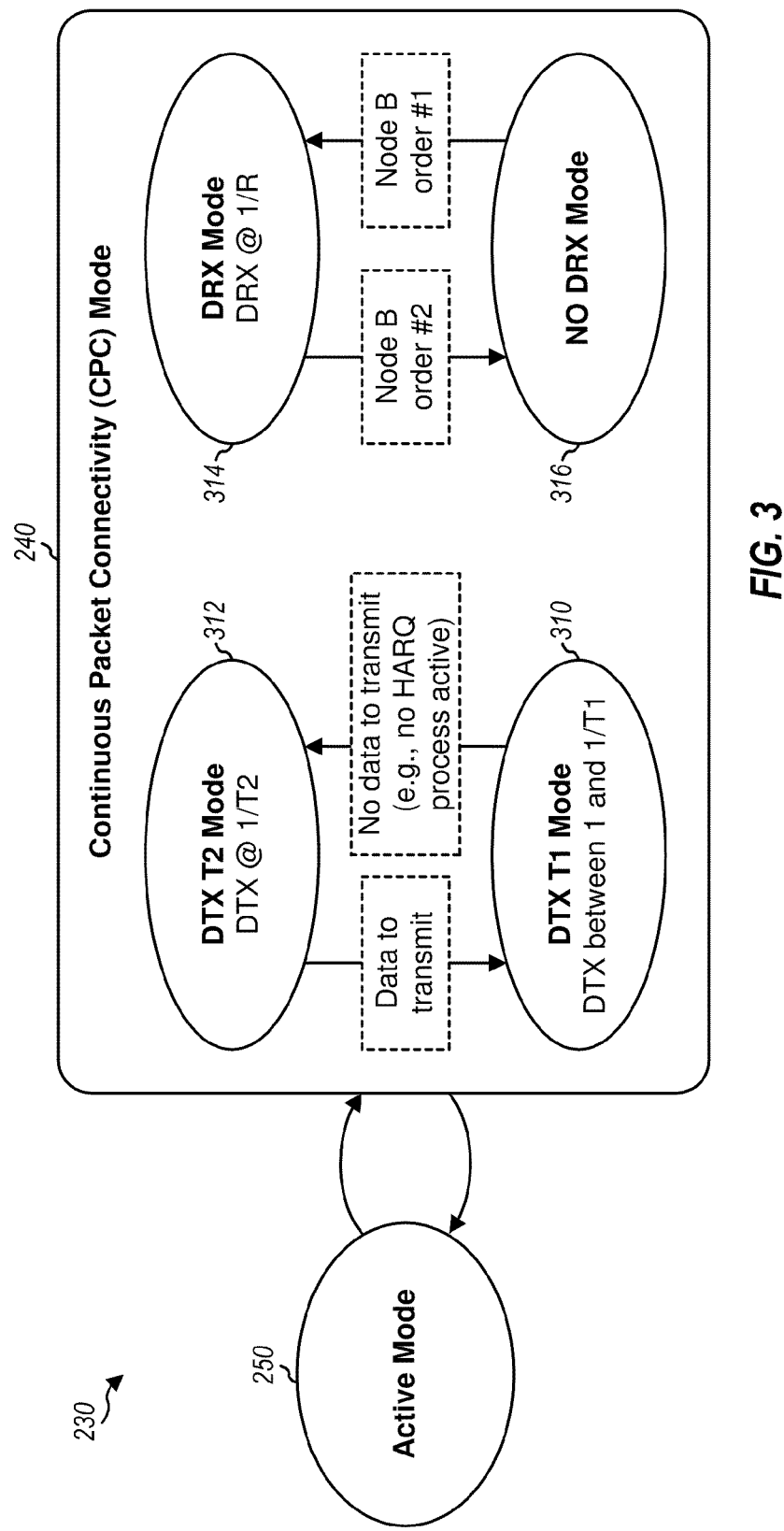
FIG. 3 shows an embodiment of the CPC mode.

FIG. 3 shows an embodiment of the CPC mode. In this embodiment, the CPC mode includes DTX modes 310 and 312, a DRX mode 314, and a NO DRX mode 316. DTX mode 310 is also referred to as DTX T1 mode, and DTX mode 312 is also referred to as DTX T2 mode. Table 3 lists the DTX and DRX modes in FIG. 3 and provides a short description for each mode.

TABLE 3

| Mode | Description |
| --- | --- |
| DTX T1 | UE has one enabled subframe in every T1 subframes on the uplink. |
| DTX T2 | UE has one enabled subframe in every T2 subframes on the uplink. |
| DRX | UE has one enabled subframe in every R subframes on the downlink. |
| NO DRX | All subframes on the downlink are enabled. |

In general, any values may be selected for T1, T2 and R. In an embodiment, T1, T2 and R are defined such that T1≦T2 and R≦T2. In an embodiment, T1, T2 and R are selected from a set of possible values. For example, T1, T2 and R may each be set equal to 1, 4, 8, or 16 and may be expressed as T1, T2 and R ∈ {1, 4, 8, 16}. Other sets of possible values may also be used for T1, T2 and R. The possible values may be power of twos and/or other values. T1=1 means that all uplink subframes are enabled. Similarly, R=1 means that all downlink subframes are enabled. The NO DRX mode may be considered as the DRX mode with R=1.

T1-enabled subframes are enabled subframes for the DTX T1 mode and are spaced apart at intervals of T1 subframes. T2-enabled subframes are enabled subframes for the DTX T2 mode and are spaced apart at intervals of T2 subframes. R-enabled subframes are enabled subframes for the DRX mode and are spaced apart at intervals of R subframes. In an embodiment, the T2-enabled subframes are a subset of the T1-enabled subframes. In other embodiments, the T2-enabled subframes may be selected independently of the T1-enabled subframes.

In an embodiment, the T1-enabled, T2-enabled, and R-enabled subframes for the UE are identified by an Offset from a reference time. This reference time may be a start time in which the CPC mode is effective for the UE and may be given in signaling used to convey CPC parameters. T1, T2 and R define three enabled subframe patterns or sets that start at a subframe where the CPC configuration was effective (the reference time) plus the Offset. In an embodiment, the parameters of the CPC mode comprise T1, T2, R, Offset, and reference time. The CPC mode may also be defined based on other parameters. The UTRAN may select suitable values for T1, T2 and R based on various factors such as data activity, network loading, and so on. The UTRAN may select different Offset values for different UEs to distribute these UEs across the available subframes.

In general, any values may be selected for T1, T2 and R. Different values may be more suitable for different services and/or different conditions. In an embodiment, the CPC parameters may be set as R=4, T1=4 and T2=8 for voice-over-Internet Protocol (VoIP). This configuration achieves appropriately 50% sleeping periods during a voice session. In an embodiment, the CPC parameters may be set as R=8, T1=1 and T2=16 for data operation. This configuration achieves a long sleeping period when there is no data to send. The UTRAN may order the UE out of DRX mode whenever there is data to send on the downlink. There is an average of R/2 subframes of delay to start a downlink packet transmission since the UE is receiving every R subframe. In an embodiment, the CPC parameters may be set as R=1, T1=4 and T2=8 when downlink delay requirements are stringent or when downlink load is high. Various other values may also be used for the CPC parameters to achieve other characteristics.

In an embodiment, the UTRAN (e.g., the RNC) configures the CPC parameters for the UE during call setup, e.g., using Layer 3 (L3) signaling and/or some other signaling. Alternatively or additionally, the UTRAN may configure or modify the CPC parameters through a Reconfiguration message during the call. The UTRAN may also configure or modify the CPC parameters in other manners and/or with other types of signaling. For example, the T1, T2 and R values may be sent as part of system information signaled by the Node B. Different T1, T2 and R values may also be defined for different call types.

Table 3 lists actions performed by the UE for each DTX and DRX mode, in accordance with an embodiment.

TABLE 4

| Mode | Actions performed by UE |
|---|---|
| DTX T1 | Transmit pilot and signaling in each T1-enabled subframe. May transmit data in any T1-enabled subframe. |
| DTX T2 | Transmit pilot and signaling in each T2-enabled subframe. No transmission of data. |
| DRX | Receive signaling on the HS-SCCH in each R-enabled subframe. May receive data on the HS-DSCH according to the signaling for scheduling information received in any R-enabled subframe. |
| NO DRX | Receive signaling on the HS-SCCH in each subframe. May receive data on the HS-DSCH in any subframe. |

FIG. 3 also shows exemplary criteria for transitioning between the DTX and DRX modes. In an embodiment, the UE can autonomously transition between the two DTX modes, e.g., based on data activity at the UE. The UE may transition from the DTX T2 mode to the DTX T1 mode whenever there is data to send on the uplink. The UE may transmit just signaling in each T1-enabled subframe that the UE has no data to send. The UE may transition from the DTX T1 mode to the DTX T2 mode if there is no data to send on the uplink, e.g., if T2 subframes have passed without any uplink data transmission.

In an embodiment, the UE may revert to full use of all uplink subframes autonomously and instantaneously. The T1-enabled subframes may be sufficient for light and/or expected exchanges of data. The UE may use more uplink subframes whenever the T1-enabled subframes are insufficient for the data load at the UE. The UE may, in essence, transition from the DTX T2 mode to the Active mode for data transmission as needed.

In an embodiment, the UE transitions between the DRX mode and the NO DRX mode as directed by the UTRAN, e.g., the Node B. Unlike DTX for the uplink, DRX operation is synchronized between the Node B and the UE. The Node B may direct the UE to transition to the DRX mode based on any of the following: (1) downlink traffic load for the UE is light, (2) downlink data rate is below a threshold and may be served at a reduced subframe rate, (3) there is lack of data activity for the UE, (4) a data queue for the UE has been empty for some time or has just been emptied, or (5) some other reason. While in the DRX mode, the UE may ignore downlink subframes that are not R-enabled subframes. The Node B may direct the UE to transition to the NO DRX mode based on any of the following: (1) data for the UE has just arrived, (2) downlink traffic load for the UE is heavy, (3) the data queue for the UE is above a threshold or is growing at a faster rate than the transmission rate to the UE, (4) cell loading is heavy, or (5) some other reason. In the NO DRX mode, the UE receives signaling (e.g., decodes the HS-SCCH) in every subframe and may receive data as indicated by the signaling.

In an embodiment, to achieve fast transition between the DRX mode and the NO DRX mode, the commands to transition between these modes are sent using fast Layer 1 (L1) and/or Layer 2 (L2) signaling from the Node B to the UE. For example, a single L1/L2 fast signaling bit may be used to enable or disable the DRX mode. The fast L1/L2 signaling provides the Node B with a fast mechanism to revert to full use of all available downlink subframes and may improve synchronization between the Node B and the UE. Sending L1/L2 signaling from the Node B to the UE may incur a delay of approximately 5 to 8 ms whereas sending L3 signaling from the RNC to the UE may incur a delay of 100 ms or more. Nevertheless, the commands to transition between modes may be sent using signaling in any layer and in any manner.

The command to transition from the NO DRX mode to the DRX mode is referred to as Node B order #1. The command to transition from the DRX mode to the NO DRX mode is referred to as Node B order #2. The UTRAN (e.g., the Node B) may send Node B order #1 whenever the UTRAN wants to ensure that both the UTRAN and the UE operate in the DRX mode. The UTRAN may send Node B order #2 whenever the UTRAN wants to ensure that both the UTRAN and the UE operate in the NO DRX mode.

HSDPA and HSUPA employ hybrid automatic retransmission (HARQ) to improve reliability of data transmission. HARQ for HSDPA and HARQ for HSUPA operate in similar manner. For HSDPA, HARQ retransmissions may be sent anytime after a minimum delay, e.g., 6 to 8 TTIs. For HSUPA, HARQ retransmissions are sent 8 TTIs later.

For HSDPA, an HARQ entity at the Node B processes and transmits a packet to the UE. A corresponding HARQ entity at the UE receives and decodes the packet. The UE sends an ACK if the packet is decoded correctly or a NAK if the packet is decoded in error. The Node B retransmits the packet if a NAK is received and transmits a new packet if an ACK is received. The Node B transmits the packet once and may retransmit the packet any number of times until an ACK is received for the packet or the Node B decides to abandon the transmission of the packet.

The Node B may transmit packets on up to eight HARQ processes to the UE. The HARQ processes may be viewed as HARQ channels used to send packets. The Node B receives downlink packets to send to the UE and transmits these packets in sequential order to the UE on the available HARQ processes. Each packet is sent on one HARQ process and includes an HARQ process ID (HID) that indicates the HARQ process used for that packet. Each HARQ process carries one packet at a time until the transmission/retransmission for that packet is completed and may then be used to send another packet.

If HARQ is used for transmission, then the condition of "no data to send" for the transition from the DTX T1 mode to the DTX T2 mode may correspond to no HARQ process being active. This in turn may be detected by no activity on any of the HARQ processes. When all HARQ processes are acknowledged, the UE may transition to the DTX T2 mode.

Figure 4:
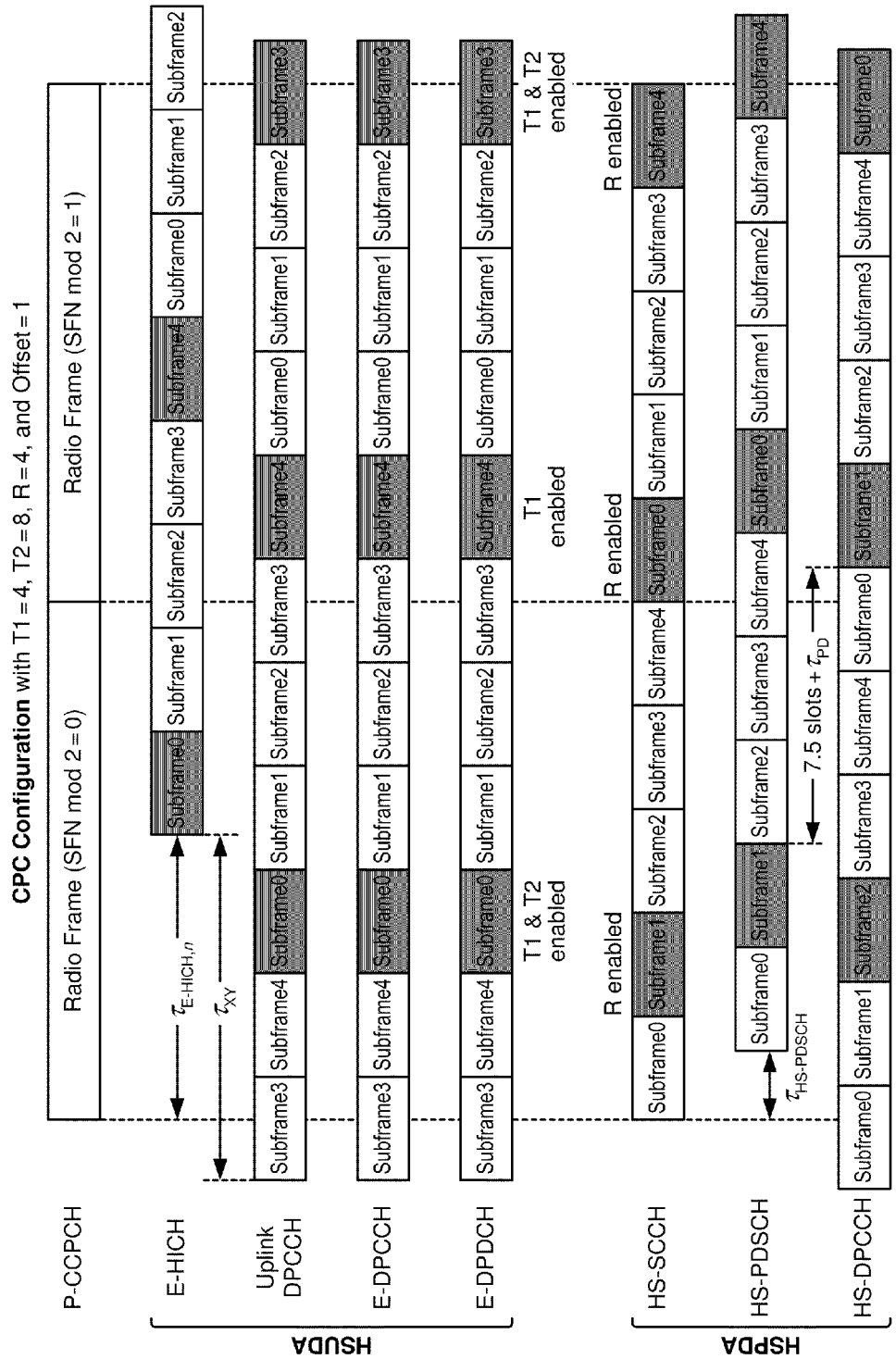
FIG. 4 shows enabled subframes for the CPC mode.

FIG. 4 shows an embodiment of the enabled subframes for HSDPA and HSUPA. In UMTS, the transmission time line is partitioned into frames, with each frame being identified by the SFN. Each frame has a duration of 10 milliseconds (ms) and is partitioned into five subframes 0 through 4. Each subframe has a duration of 2 ms and covers three slots. Each slot has a duration of 0.667 ms and covers 2560 chips at 3.84 Mcps, or $T_{slot}=2560$ chips.

On the downlink, the P-CCPCH carries pilot and the SFN. The P-CCPCH is used directly as timing reference for downlink channels and is used indirectly as timing reference for uplink channels. The subframes of the HS-SCCH are time-aligned with the P-CCPCH. The subframes of the HS-PDSCH are delayed by $\tau_{HS-PDSCH}=2T_{slot}$ from the subframes of the HS-SCCH. The subframes of the E-HICH are delayed by $\tau_{E\text{-}HICH,n}$ from the subframes of the HS-SCCH, where $\tau_{E\text{-}HICH,n}$ is defined in 3GPP TS 25.211.

On the uplink, the subframes of the HS-DPCCH are delayed by 7.5 slots from the subframes of the HS-PDSCH at the UE, where $\tau_{PD}$ in FIG. 4 denotes the propagation delay from the Node B to the UE. The uplink DPCCH, E-DPCCH, and E-DPDCH are time-aligned and their frame timing is m×256 chips from the frame timing of the HS-DPCCH. The timing of the uplink DPCCH is not directly related to the timing of the HS-DPCCH. The frame timing for the downlink and uplink channels is described in 3GPP TS 25.211.

FIG. 4 also shows an exemplary CPC configuration with T1=4, T2=8, R=4, and Offset=1. In this example, the T1-enabled subframes on the uplink DPCCH, E-DPCCH, E-DPDCH, and E-HICH are spaced apart by 4 subframes. The T2-enabled subframes on the uplink DPCCH are spaced apart by 8 subframes. The R-enabled subframes on the HS-SCCH, HS-DPDCH and HS-DPCCH are spaced apart by 4 subframes. The Offset determines the specific subframes to use for the enabled subframes. The T1-enabled, T2-enabled, and R-enabled subframes may be aligned in time (e.g., as described in TR25.903, section 4.5.2.1) to reduce rise-over-thermal (ROT) and to extend possible sleep time for the UE between the enabled subframes. For example, transmissions on the uplink (including ACKs for downlink transmissions) may be clubbed or combined together to reduce ROT at the Node B. Transmissions on the downlink (including ACKs for uplink transmissions) may also be clubbed together to reduce wake up time at the wireless device.

Figure 5A:
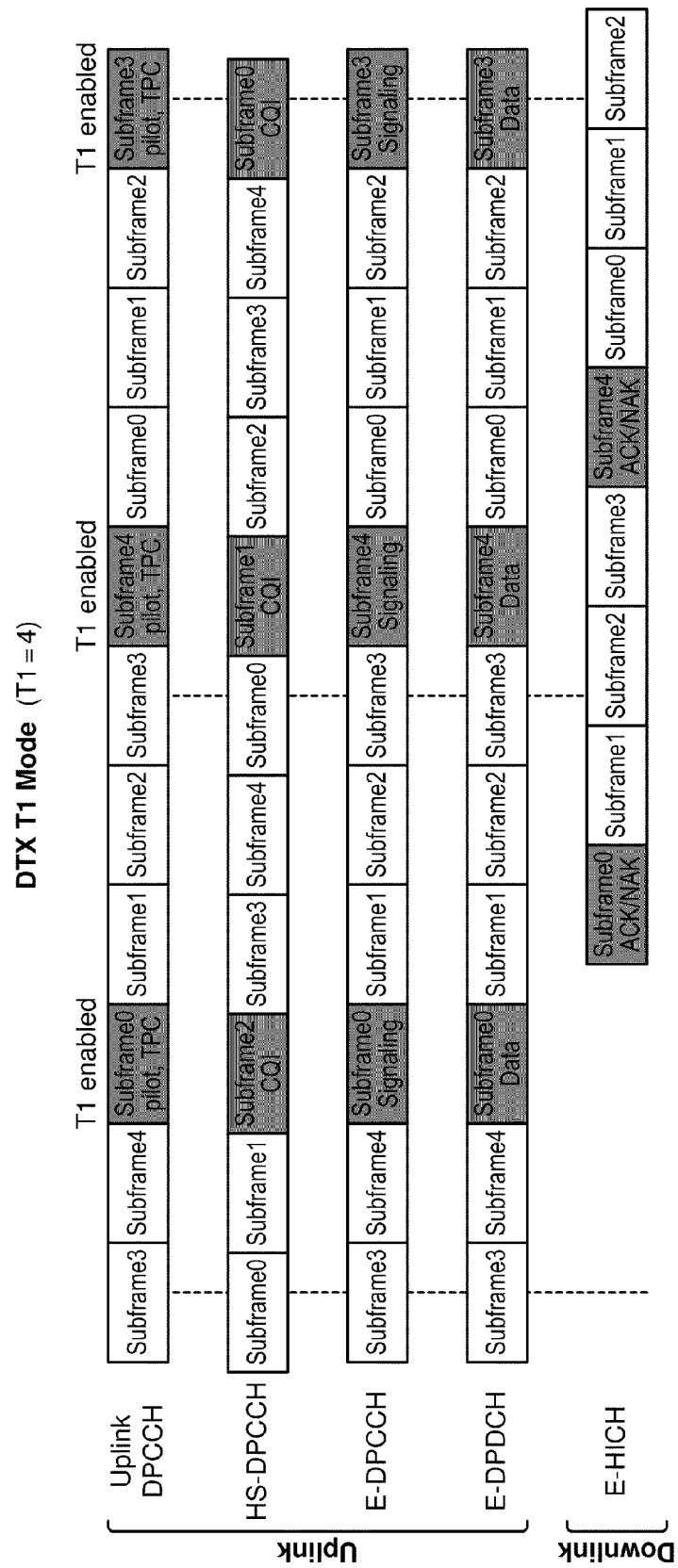

FIG. 5A shows exemplary operation of the UE in the DTX T1 mode for the CPC configuration shown in FIG. 4. The UE transmits pilot and signaling (e.g., TPC) on the uplink DPCCH and signaling (e.g., CQI) on the HS-DPCCH in each T1-enabled subframe. If the UE has data to send in a given T1-enabled subframe, then the UE transmits signaling on the E-DPCCH, transmits data on the E-DPDCH, and receives ACK/NAK on the E-HICH.

FIG. 5B shows exemplary operation of the UE in the DTX T2 mode for the CPC configuration shown in FIG. 4. The UE transmits pilot and signaling (e.g., TPC) on the uplink DPCCH and signaling (e.g., CQI) on the HS-DPCCH in each T2-enabled subframe. The UE does not transmit signaling on the E-DPCCH, does not transmit data on the E-DPDCH, and does not receive ACK/NAK on the E-HICH.

FIG. 5C shows exemplary operation of the UE in the DRX mode for the CPC configuration shown in FIG. 4. The UE receives signaling on the HS-SCCH in each R-enabled subframe. The UE may receive data on the HS-DPDCH in any R-enabled subframe and may then send ACK/NAK on the HS-DPCCH.

In the embodiment shown in FIGS. 5A through 5C, CQI reports are sent in the T1-enabled subframes in the DTX T1 mode and in the T2-enabled subframes in the DTX T2 mode. In another embodiment, CQI reports are sent in the R-enabled subframes. The UE may also send additional CQI reports when sending ACKs/NAKs. The additional CQI reports may be used for retransmissions or new transmissions.

In an embodiment, the two DTX modes and the DRX mode may be defined independently of one another. In another embodiment, the DTX and DRX modes are jointly parameterized, e.g., to time align the T1-enabled subframes with the R-enabled subframes. This embodiment may extend sleep time and enhance battery savings for the UE. In yet another embodiment, the spacing of T1 and R is such that subframes used for retransmissions are automatically enabled subframes.

In an embodiment, the UTRAN (e.g., the Node B) expects uplink transmission from the UE only in the T1-enabled subframes. In another embodiment, the UTRAN expects uplink transmission from the UE in all subframes and thus always listens for the UE. Since the UE can autonomously transition between the DTX T1 mode and the DTX T2 mode, the UTRAN may not receive uplink transmissions in some T1-enabled subframes. The UTRAN may determine whether the UE transmits the uplink DPCCH in each T1-enabled subframe (e.g., based on the pilot) and may discard the received signaling (e.g., TPC bits for downlink power control) if the pilot is absent or is of insufficient quality.

In an embodiment, the UE expects downlink transmissions from the UTRAN in the R-enabled subframes while in the DRX mode and in any subframe while in the NO DRX mode. The UE may discard signaling (e.g., TPC bits for uplink power control) that does not correspond to a transmission sent by the UE. The UE starts DRX operation upon receiving Node B order #1 and stops DRX operation upon receiving Node B order #2.

If there is at least one HARQ process active, then the UE attempts to transmit using the T1-enabled subframes. If the UTRAN expects uplink transmissions from the UE in all subframes, then the UE may use other subframes if the T1-enabled subframes are not sufficient. The UE does not DTX more than (T1−1) subframes while there is at least one HARQ process active. If there are no active HARQ processes, then the UE transmits pilot and signaling (e.g., CQI) on the T2-enabled subframes and does not DTX more than (T2−1) subframes.

Figure 6A:
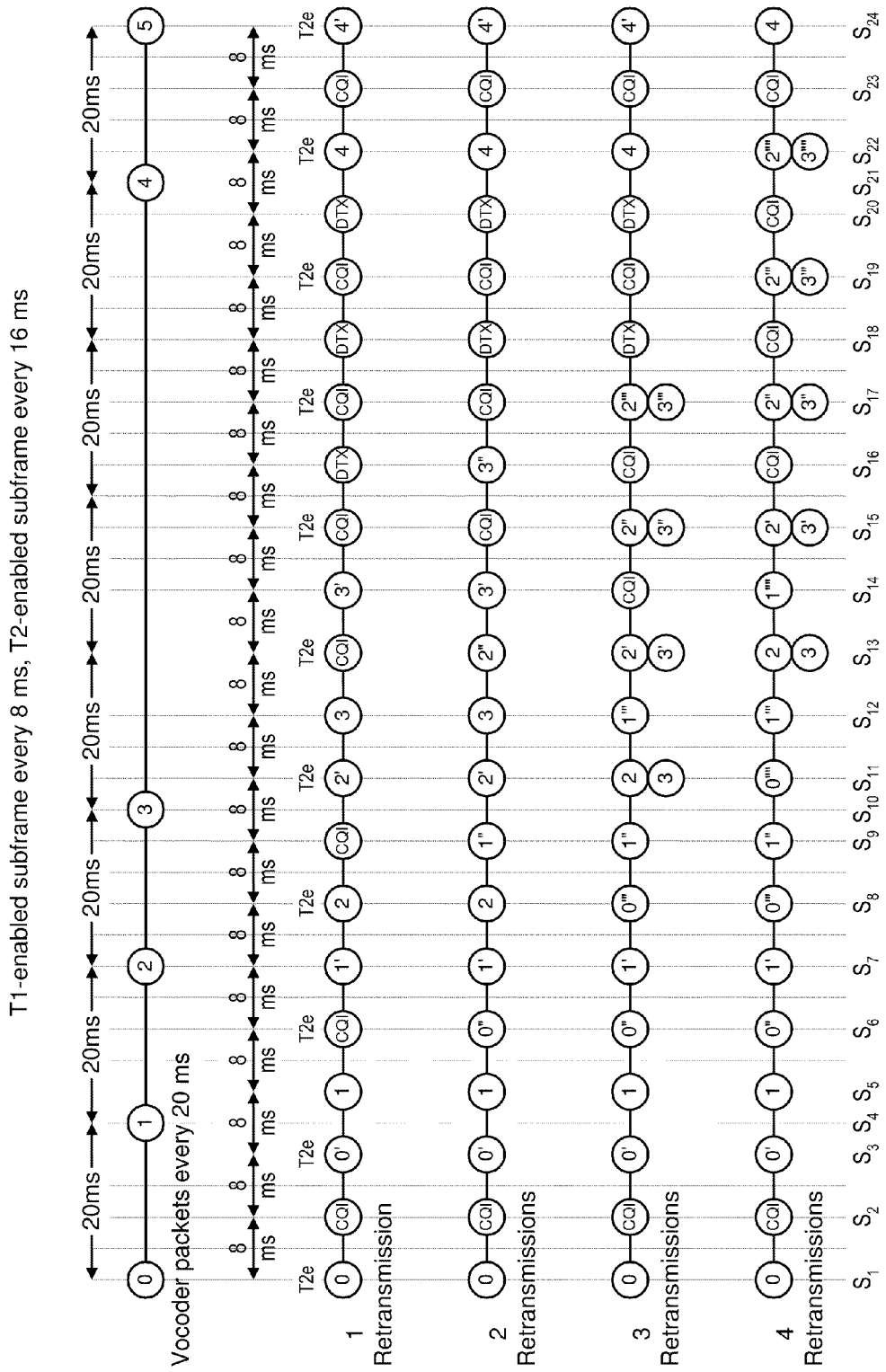
FIGS. 6A and 6B show exemplary uplink transmissions in the CPC mode.

FIG. 6A shows exemplary uplink transmissions for a CPC configuration with T1=4=8 ms and T2=8=16 ms. In this example, the UE may receive vocoder packets from upper layer every 20 ms. Line 1 in FIG. 6A shows vocoder packets received by the UE. Lines 2 through 5 show packet transmissions and retransmissions for different maximum numbers of retransmissions (N). The T1-enabled subframes are represented by circles in lines 2 through 5. The T2-enabled subframes are every other circle in lines 2 through 5 and are indicated by label "T2e" above line 2. The UE transitions to the DTX T1 mode upon receiving the first packet 0 for transmission to the UTRAN.

For N=1 retransmission in line 2, packet 0 is received in subframe $S_1$ and sent in T1-enabled subframes $S_1$ and $S_3$, packet 1 is received in subframe $S_4$ and sent in T1-enabled subframes $S_5$ and $S_7$, and so on. Pilot and CQI are sent in T1-enabled subframes, including subframes $S_2$, $S_6$, $S_9$, $S_{13}$ and $S_{15}$ without any data transmission. HARQ processes for packets 0, 1, 2 and 3 are completed after subframe $S_{14}$. The UE transitions to the DTX T2 mode in subframe $S_{16}$ and sends pilot and CQI in T2-enabled subframes $S_{17}$ and $S_{19}$. The UE transitions to the DTX T1 mode upon receiving packet 4 in subframe $S_{21}$ and sends this packet in T1-enabled subframes $S_{22}$ and $S_{24}$.

For N=2 retransmissions in line 3, packet 0 is received in subframe $S_1$ and sent in T1-enabled subframes $S_1$, $S_3$ and $S_6$, packet 1 is received in subframe $S_4$ and sent in T1-enabled subframes $S_5$, $S_7$ and $S_9$, and so on. Pilot and CQI are sent in T1-enabled subframes, including subframes $S_2$ and $S_{15}$ without any data transmission. HARQ processes for packets 0, 1, 2 and 3 are completed after subframe $S_{16}$. The UE transitions to the DTX T2 mode in subframe $S_{18}$ and sends pilot and CQI in T2-enabled subframes $S_{19}$. The UE transitions to the DTX T1 mode upon receiving packet 4 in subframe $S_{21}$ and sends this packet in T1-enabled subframes $S_{22}$ and $S_{24}$.

The packet transmission and retransmission occur in similar manner for N=3 retransmissions in line 4 and N=4 retransmissions in line 5. Multiple packets may be sent in some T1-enabled subframes.

Figure 6B:
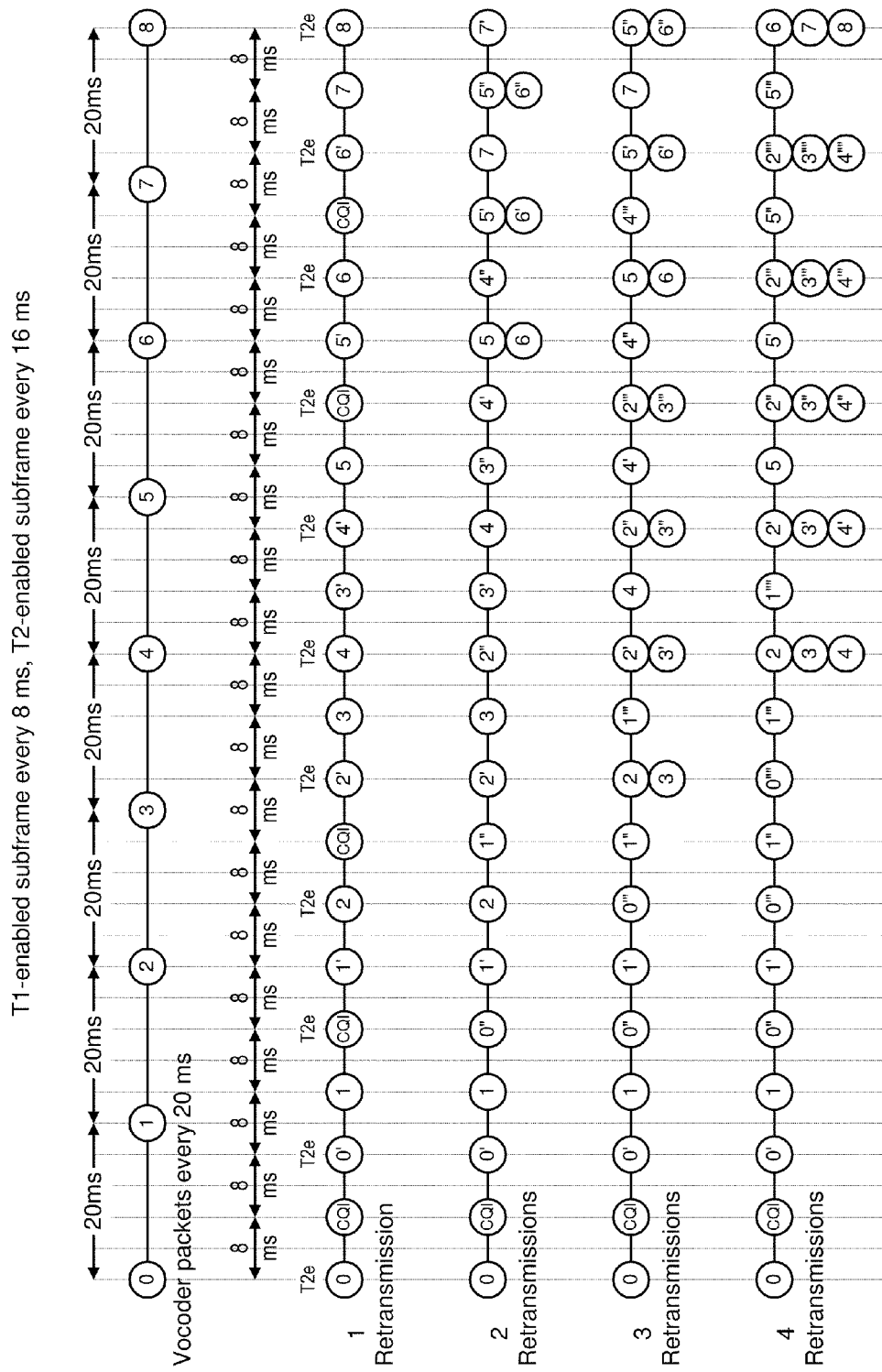

FIG. 6B shows exemplary uplink transmissions for the CPC configuration with T1=4=8 ms and T2=8=16 ms. In this example, the UE receives vocoder packets from upper layer every 20 ms. The UE does not transition to the DTX T2 mode because at least one HARQ process is active during the entire time duration shown in FIG. 6B. More than two packets may be sent in a given T1-enabled subframe for N=4 retransmissions.

Figure 7:
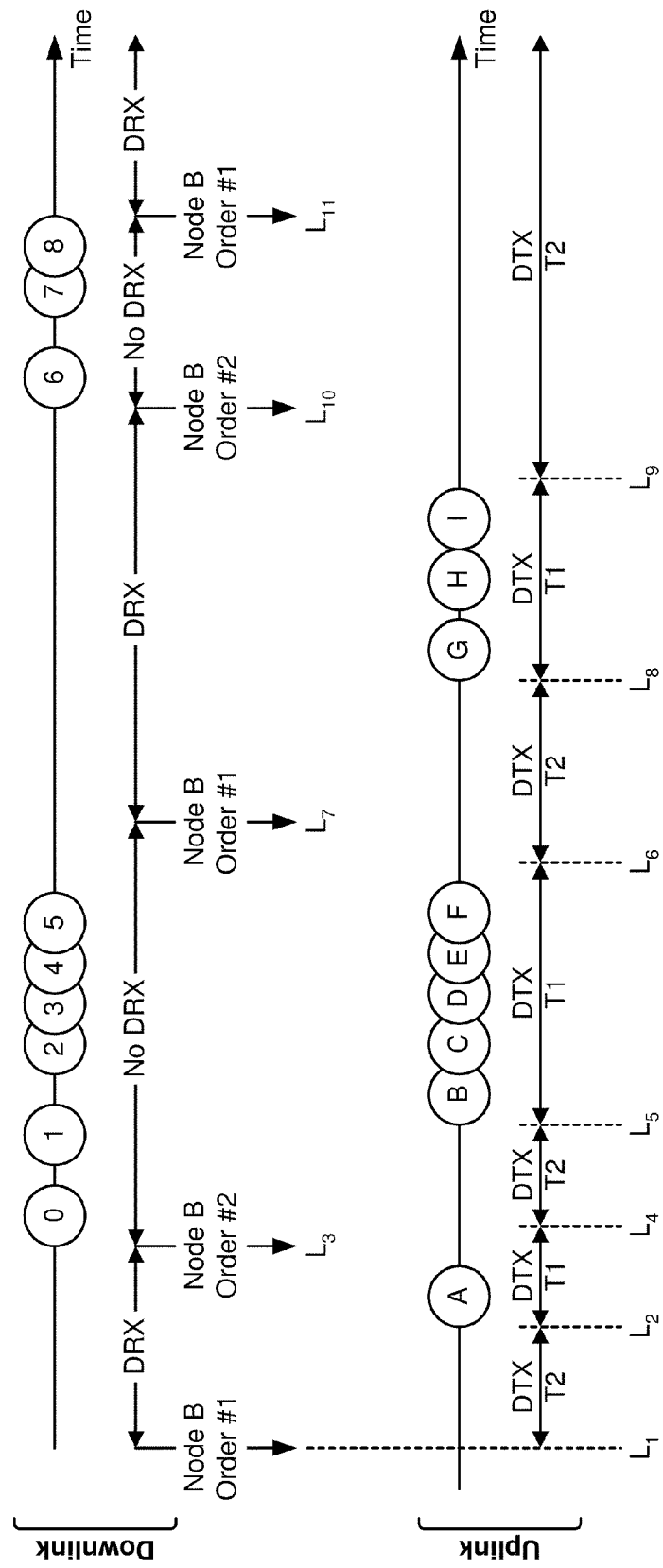
FIG. 7 shows exemplary downlink and uplink transmissions in the CPC mode.

FIG. 7 shows exemplary downlink and uplink transmissions in the CPC mode. At time $L_1$, the UE operates in the DRX mode upon receiving Node B order #1 and also autonomously selects the DTX T2 mode. At time $L_2$, the UE has data to send, transitions to the DTX T1 mode, and transmits packet A. At time $L_3$, the UE transitions to the NO DRX mode upon receiving Node B order #2 and thereafter receives packets 0 through 5. At time $L_4$, the UE transitions to the DTX T2 mode following a period of no activity after sending packet A. At time $L_5$, the UE has data to send, transitions to the DTX T1 mode, and transmits packets B through F. At time $L_6$, the UE transitions to the DTX T2 mode following a period of no activity. At time $L_7$, the UE transitions to the DRX mode upon receiving Node B order #1. At time $L_8$, the UE has data to send, transitions to the DTX T1 mode, and transmits packets G through I. At time $L_9$, the UE transitions to the DTX T2 mode following a period of no activity. At time $L_{10}$, the UE transitions to the NO DRX mode upon receiving Node B order #2 and thereafter receives packets 6 through 8. At time $L_{11}$, the UE transitions to the DRX mode upon receiving Node B order #1.

In the embodiment shown in FIG. 3, the UTRAN sends Node B orders to direct the UE to transition between the DRX mode and the NO DRX mode. The Node B orders (e.g., #1 and #2) may be sent in various manners. In general, it is desirable to send the Node B orders using a reliable mechanism since these orders affect network operation and performance. This may be achieved by sending the Node B orders on a control channel with low error probability and/or acknowledgement. In an embodiment, the Node B orders are sent on the HS-SCCH, which is fairly robust and has an ACK mechanism. This improves the reliability of the Node B orders and reduces miscommunication problems due to the UTRAN and the UE being in different modes.

Figure 8:
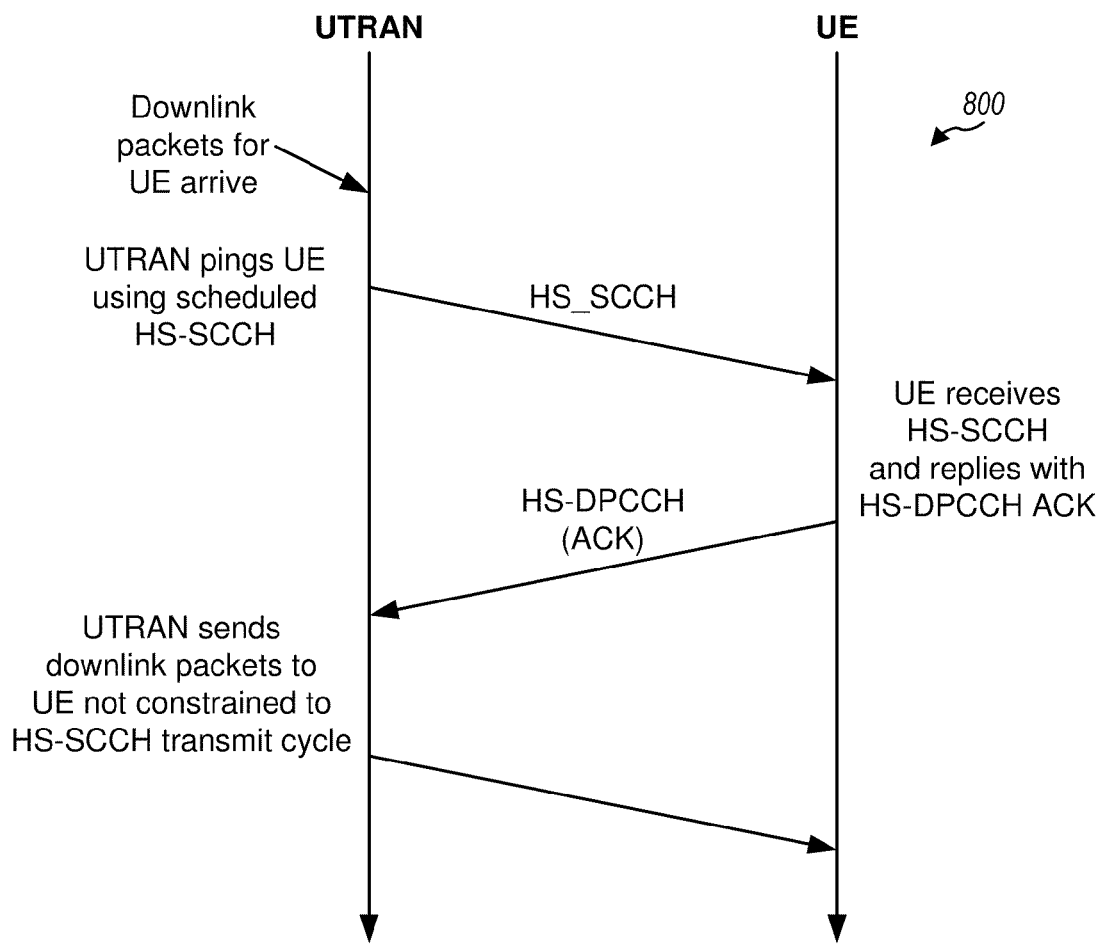
FIG. 8 shows an event flow for transitioning from DRX mode to NO DRX mode.

FIG. 8 shows an embodiment of an event flow 800 for transitioning from the DRX mode to the NO DRX mode based on downlink activity. This embodiment assumes that Node B order #2 is sent on the HS-SCCH. The UTRAN receives downlink packets for the UE. The UTRAN then sends Node B order #2 on the HS-SCCH in the next R-enabled subframe. The average delay in sending Node B order #2 is R/2 subframes. The UE receives Node B order #2 on the HS-SCCH and replies by sending an ACK on the HS-DPCCH. Upon receiving the ACK, the UTRAN can send packets to the UE in any subframes and is not constrained to the R-enabled subframes. The UTRAN may also send Node B order #1 on the HS-SCCH in similar manner as Node B order #2.

On the downlink, there is an average delay of R/2 subframes to start a new packet transmission to the UE in the DRX mode. The Node B may order the UE out of the DRX mode, and the subsequent delay may be reduced to as low as zero. Retransmissions may further delay a new packet transmission. In the embodiment described above, on the uplink, the delay is under the control of the UE since the UE may transmit in any subframe. In other embodiments, certain restrictions may be imposed on when the UE can start uplink transmission in order to aid detection at the Node B. For example, the UE may be restricted to start an uplink transmission in a T1-enabled subframe, a T2-enabled subframe, or some other subframe.

The Node B orders may be sent in various manners. In an embodiment, the UE is assigned a first 16-bit HS-DSCH Radio Network Identifier (H-RNTI) for UE identity (as normally done) and is further assigned a second 16-bit H-RNTI for Node B orders. H-RNTI is described in 3GPP TS 25.212, section 4.6. The second H-RNTI provides space of 21 bits for orders and future extensions. In another embodiment, one 16-bit H-RNTI is reserved for broadcasting orders. An order message may include the UE-specific H-RNTI (16 bits), creating space of 5 bits for orders and future extensions. The Node B orders may also be sent on other control channels and/or in other manners.

There may be transmission errors and/or detection errors of the Node B orders. The UTRAN and the UE may then operate in different modes. Two different possible error scenarios are described below.

The UTRAN may operate in the DRX mode, and the UE may operate in the NO DRX mode. This error situation may arise due to (1) the UTRAN sending Node B order #1 and the UE failing to detect the order or (2) the UE erroneously detecting Node B order #2 when none was sent. The Node B would restrict its downlink transmissions to the R-enabled subframes while the UE receives all subframes. The UE consumes extra battery power, but no data is lost.

The UTRAN may operate in the NO DRX mode, and the UE may operate in the DRX mode. This error situation may arise due to (1) the UE erroneously detecting Node B order #1 when none was sent or (2) the UTRAN sending Node B order #2 and the UE failing to detect the order. The UTRAN may transmit on any subframe while the UE receives only the R-enabled subframes. Data transmitted in subframes other than the R-enabled subframes would be lost. This error situation is detectable. The UTRAN may detect for this type of error and may implement a proper recovery mechanism.

The CPC mode may provide certain advantages. The DTX T1 mode defines a certain minimum duty cycle T1 that may maximize capacity during data transmission. The UE may synchronize its transmission times with its reception times to extend its sleep cycle. The UTRAN (e.g., Node B) has a pattern of known times where uplink transmissions are required or are more probable. The DTX T2 mode may facilitate synchronization, simplify detection and search of uplink transmissions, and simplify Node B implementation. The UTRAN has knowledge of the minimum set of enabled subframes, which may reduce impact of searching for the uplink DPCCH from the UE at the Node B. For example, the Node B may not search each subframe if it knows that uplink transmissions are sent in or starting at T2-enabled subframes. The detection at the Node B may also be simplified compared to a system that does not utilize T2-enabled subframes. In such a system, it may be harder for the Node B to detect a signal that is transmitted erratically without a known periodicity, which may help energy accumulation/correlation.

Referring back to FIG. 2, the UE may transition from the CPC mode to the Active mode based on any of the following: (1) the amount of downlink data to send to the UE (e.g., for a new transport and/or logical channel) suggests use of more downlink subframes, (2) the network is congested and scheduler performance may be improved by allowing the scheduler to freely use all of the downlink subframes, and/or (3) some other reason. The UE may transmit data in any uplink subframe and/or receive data in any downlink subframe in the Active mode. The Active mode may improve performance at the expense of more battery power. The UE may transition from the Active mode to the CPC mode based on any of the following: (1) traffic load for the UE is light, (2) there is lack of user data activity, or (3) some other reason. The UTRAN can ascertain downlink data activity of the UE based on the status of the data queue for the UE and can ascertain uplink data activity of the UE based on reception of status reports of a data buffer maintained by the UE.

In an embodiment, the UTRAN directs the UE to operate in the Active mode or the CPC mode. The UTRAN may direct the UE to switch mode by sending a mode switch command or some other signaling. The UTRAN may also direct the UE to transition to the CPC mode by sending the parameters for the CPC mode. In another embodiment, the UE may elect to operate in the Active mode or the CPC mode and may send either a request for a mode switch (if the decision is made by the UTRAN) or an indication of a mode switch (if the decision can be made by the UE).

The UTRAN (e.g., the RNC) may command the UE to transition to the CPC mode (e.g., by sending the CPC parameters or a mode switch) whenever the UTRAN wants to ensure that both the UTRAN and the UE are operating in the CPC mode. The UTRAN may also command the UE to transition to the Active mode whenever the UTRAN wants to ensure that both the UTRAN and the UE are operating in the Active mode.

In the embodiment shown in FIG. 3, the CPC mode includes two DTX modes, one DRX mode, and a no DRX mode. In general, the CPC mode may include any number of DTX modes, a no DTX mode, any number of DRX modes, a no DRX mode, or any combination thereof. The no DTX mode may be considered as a special case of the DTX T1 mode with T1=1.

In another embodiment, the CPC mode includes a Connected Deep mode (or simply, a Deep mode) mode in which the UE has one enabled subframe in every T3 subframes on the uplink and one enabled subframe in every R2 subframes on the downlink. In general, T3 and R2 may be defined as T3≧T2 and R2≧R. T3 and R2 may be set to large values, e.g., much larger than T2 and R, respectively, or possibly infinity. The Deep mode may be disabled by setting T3=T2 and/or R2=R.

In the Deep mode, the UE may (a) stop listening or listen very infrequently to the downlink and (b) stop transmitting or transmit very infrequently on the uplink. The UE may measure the CPICH and P-CCPCH and may decode the HS-SCCH of the serving and surrounding Node Bs in the R2-enabled subframes. The UE may update its Active Set of Node Bs, if necessary, based on the measurements. The UE may ignore TPC commands sent by the Node B to adjust the transmit power of the UE. The UE may transition out of the Deep mode based on various triggering events, e.g., if the UE receives data in its buffer or receives a packet on the downlink. If any triggering event occurs, then the UE may transition to (a) the DTX T1 mode, the DTX T2 mode, or the no DTX mode for transmission on the uplink and (b) the DRX mode or the no DRX mode for reception on the downlink. While in the Deep mode, UE synchronization at the Node B is likely lost. A procedure may be used to re-activate the UE from the Deep mode. This re-activation may be accompanied by a sufficiently long DPCCH preamble to allow the closed-loop power control mechanism to bring the transmit power of the UE back to the proper power level.

For clarity, the techniques have been specifically described for UMTS. The CPC mode may be a mode or a configuration of the CELL_DCH state, as shown in FIG. 2. The CPC mode may also be employed in other manners in UMTS.

The techniques described herein may also be used for other communication networks, other channel structures, other frame and subframe structures, and/or other transmission schemes. The techniques may be used for HARQ as well as non-HARQ transmissions.

Figure 9:
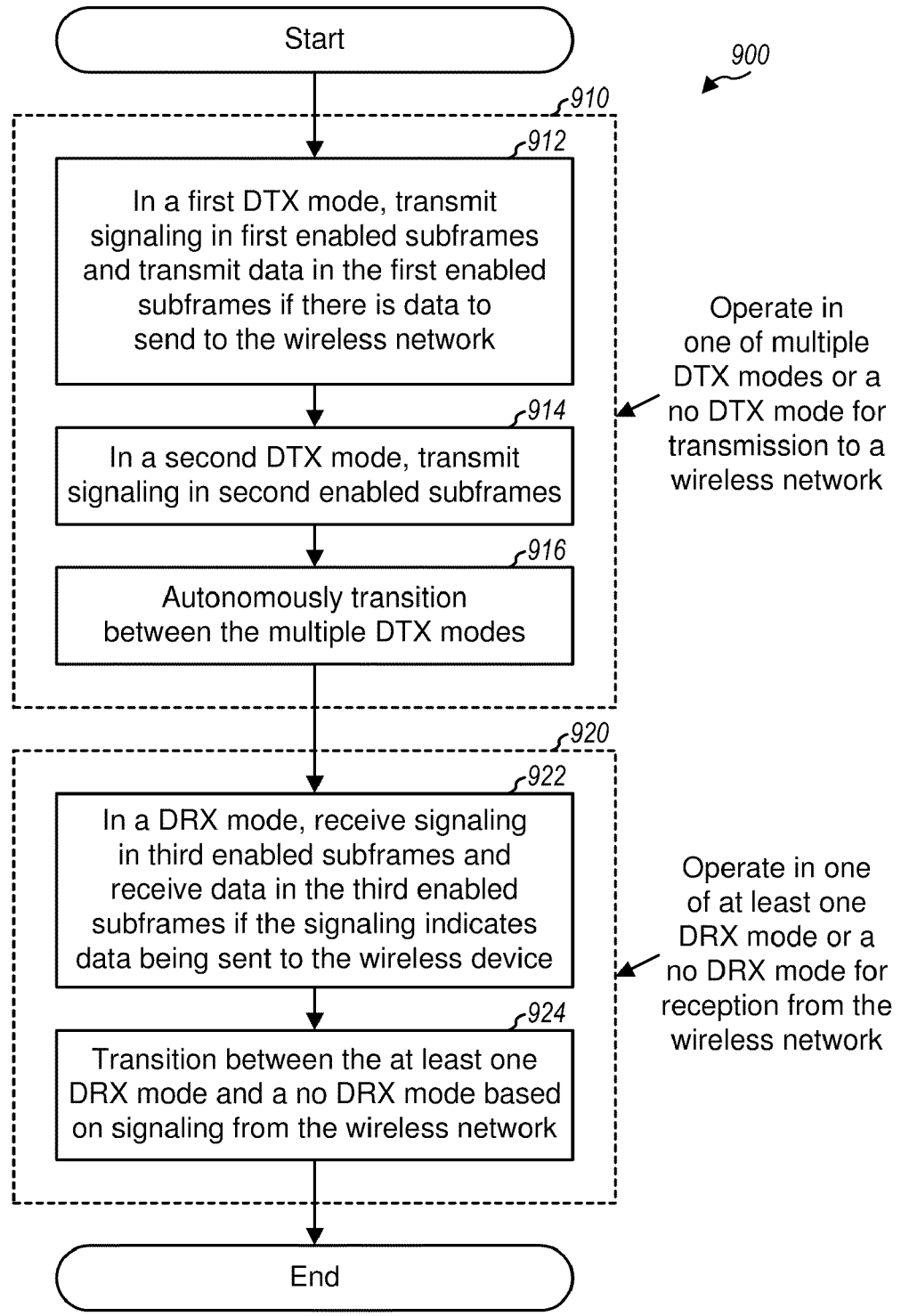
FIG. 9 shows a process performed by the UE in the CPC mode.

FIG. 9 shows an embodiment of a process 900 performed by a wireless device for operation in a CPC mode. While in the connected mode, the wireless device operates in one of multiple DTX modes or a no DTX mode for transmission to a wireless network (block 910). The wireless device also operates in one of at least one DRX mode or a no DRX mode for reception from the wireless network (block 920). Each DTX mode may be associated with different subframes usable for sending signaling and/or data to the wireless network. The no DTX mode may be associated with all subframes being usable for sending signaling and/or data to the wireless network. Each DRX mode may be associated with different subframes usable for receiving signaling and/or data from the wireless network. The no DRX mode may be associated with all subframes being usable for receiving signaling and/or data from the wireless network. The wireless device may operate in any of the following: (1) DTX and DRX, (2) DTX and no DRX, (3) no DTX and DRX, or (4) no DTX and no DRX.

The multiple DTX modes may comprise first and second DTX modes. In the first DTX mode, the wireless device may transmit signaling in first enabled subframes and may transmit data in the first enabled subframes if there is data to send to the wireless network (block 912). In the second DTX mode, the wireless device may transmit signaling in second enabled subframes (block 914). In an embodiment, the wireless device sends signaling for Layer 1 (e.g., pilot, TPC, CQI, and so on) and may send signaling for higher layers in the first DTX mode, and sends only Layer 1 signaling in the second DTX mode. In general, the wireless device may be allowed to send different types of signaling or may be restricted to send only certain types of signaling in each DTX mode. The signaling sent in the first DTX mode may thus be the same as or different from the signaling sent in the second DTX mode. The at least one DRX mode may comprise a single DRX mode. In the DRX mode, the wireless device may receive signaling in third enabled subframes and may receive data in the third enabled subframes if the signaling indicates data being sent to the wireless device (block 922). The first enabled subframes may be a subset of the subframes available for the uplink and may be spaced apart by T1 subframes. The second enabled subframes may be a subset of the first enabled subframes and may be spaced apart by T2 subframes. The third enabled subframes may be a subset of the subframes available for the downlink and may be spaced apart by R subframes. T1, T2, and/or R may be configurable parameters.

The wireless device may autonomously transition between the multiple DTX modes and may autonomously transition to a no DTX mode based on data load at the wireless device (block 916). The wireless device may transition between the at least one DRX mode and a no DRX mode based on signaling from the wireless network (block 924). The wireless device may also transition between an active mode and the CPC mode based on signaling from the wireless network. The active mode may correspond to all subframes being usable for transmission and reception.

Figure 10:
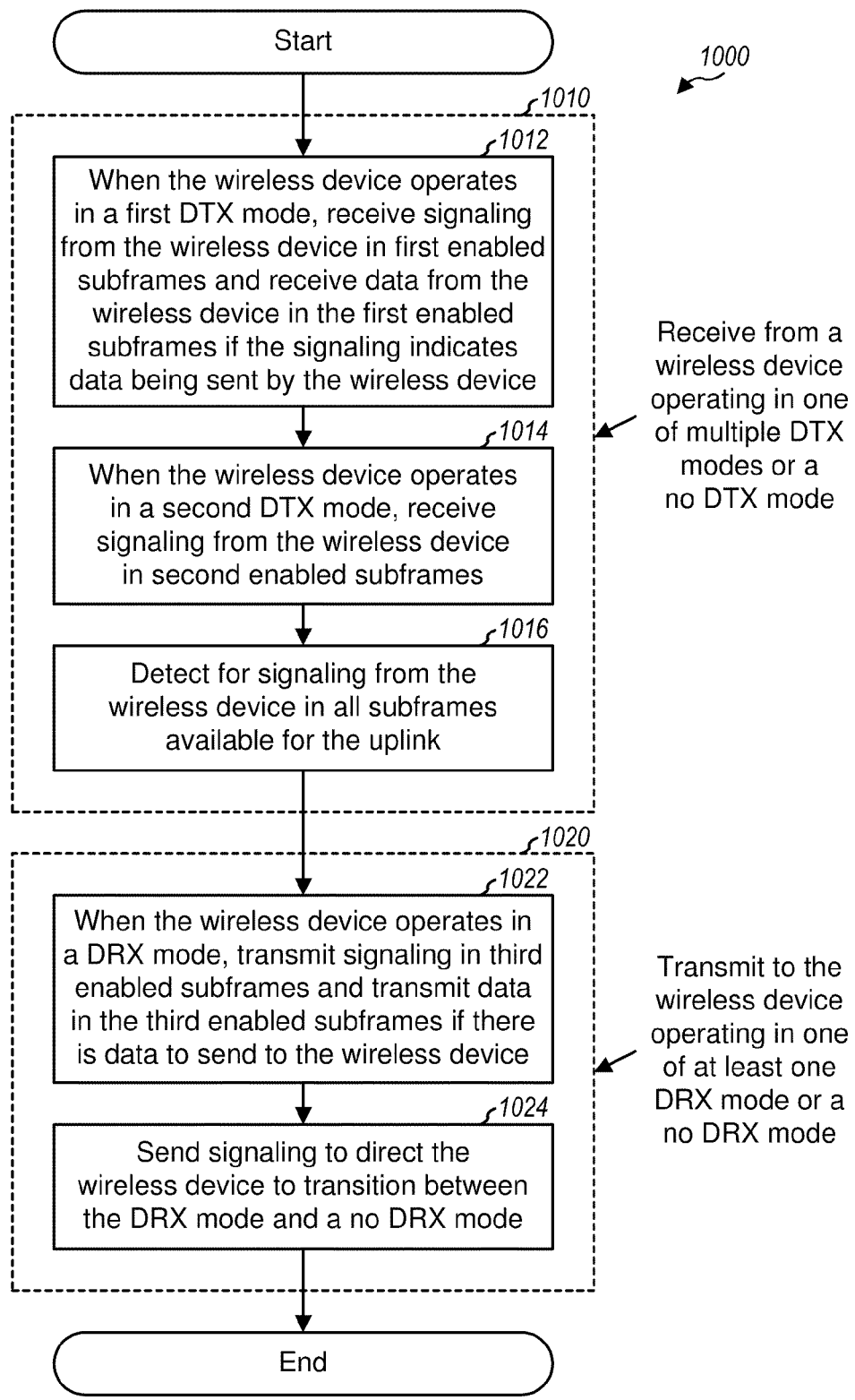
FIG. 10 shows a process performed by the network for the CPC mode.

FIG. 10 shows an embodiment of a process 1000 performed by a wireless network for the CPC mode. The wireless network receives from a wireless device operating in one of multiple DTX modes or a no DTX mode while in a connected mode (block 1010). The wireless network transmits to the wireless device operating in one of at least one DRX mode or a no DRX mode while in the connected mode (block 1020).

The multiple DTX modes may comprise first and second DTX modes. When the wireless device operates in the first DTX mode, the wireless network may receive signaling from the wireless device in first enabled subframes and may receive data from the wireless device in the first enabled subframes if the signaling indicates data being sent (block 1012). When the wireless device operates in the second DTX mode, the wireless network may receive signaling from the wireless device in second enabled subframes (block 1014). The wireless network may detect for signaling from the wireless device in all subframes available for the uplink (block 1016). The at least one DRX mode may comprise a single DRX mode. When the wireless device operates in the DRX mode, the wireless network may transmit signaling in third enabled subframes and may transmit data in the third enabled subframes if there is data to send to the wireless device (block 1022). The wireless network may send signaling to direct the wireless device to transition between the DRX mode and a no DRX mode (block 1024). The wireless network may also send signaling to direct the wireless device to transition between the active mode and the CPC mode.

Figure 11:
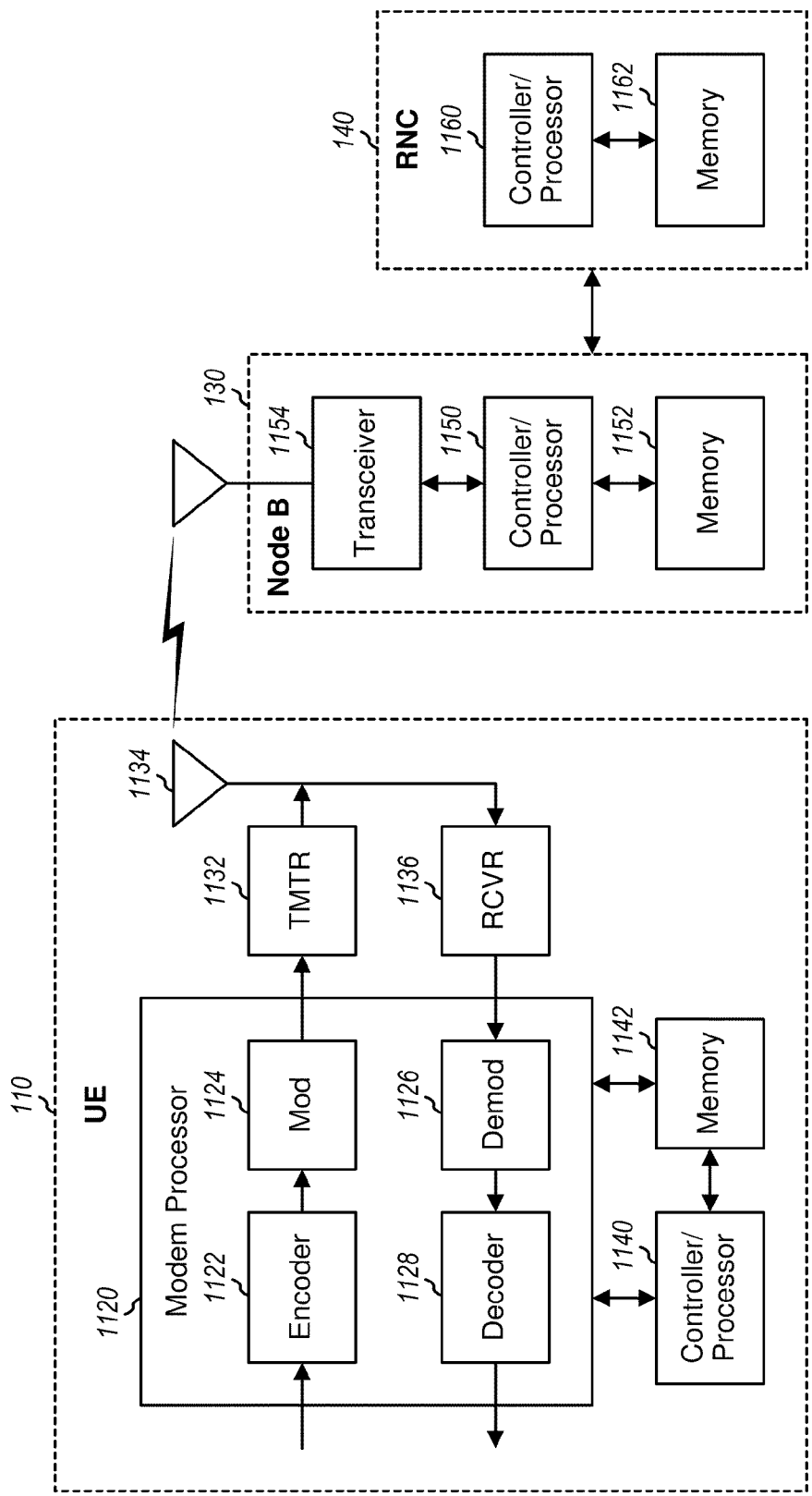
FIG. 11 shows a block diagram of the UE, a Node B, and an RNC.

FIG. 11 shows a block diagram of an embodiment of UE 110, Node B 130, and RNC 140 in FIG. 1. On the uplink, data and signaling to be sent by UE 110 are processed (e.g., formatted, encoded, and interleaved) by an encoder 1122 and further processed (e.g., modulated, channelized, and scrambled) by a modulator (Mod) 1124 to generate output chips. A transmitter (TMTR) 1132 then conditions (e.g., converts to analog, filters, amplifies, and frequency upconverts) the output chips and generates an uplink signal, which is transmitted via an antenna 1134. On the downlink, antenna 1134 receives a downlink signal transmitted by Node B 130. A receiver (RCVR) 1136 conditions (e.g., filters, amplifies, frequency downconverts, and digitizes) the received signal from antenna 1134 and provides samples. A demodulator (Demod) 1126 processes (e.g., descrambles, channelizes, and demodulates) the samples and provides symbol estimates. A decoder 1128 further processes (e.g., deinterleaves and decodes) the symbol estimates and provides decoded data. Encoder 1122, modulator 1124, demodulator 1126, and decoder 1128 may be implemented by a modem processor 1120. These units perform processing in accordance with the radio technology (e.g., W-CDMA or cdma2000) used by the network.

A controller/processor 1140 directs the operation of various units at UE 110. Controller/processor 1140 may perform process 900 in FIG. 9 and/or other processes for the techniques described herein. A memory 1142 stores program codes and data for UE 110, e.g., parameters and orders for CPC operation.

FIG. 11 also shows an embodiment of Node B 130 and RNC 140. Node B 130 includes a controller/processor 1150 that performs various functions for communication with UE 110, a memory 1152 that stores program codes and data for Node B 130, and a transceiver 1154 that supports radio communication with UE 110. Controller/processor 1150 may perform process 1000 in FIG. 10 and/or other processes for the techniques described herein and may also send Node B orders to UE 110 in the CPC mode. RNC 140 includes a controller/processor 1160 that performs various functions to support communication for UE 110 and a memory 1162 that stores program codes and data for RNC 140. Controller/processor 1160 may configure the CPC mode and may direct transition between the Active mode and the CPC mode for UE 110.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for discontinuous receiving, comprising:
operating in one of at least one discontinuous reception (DRX) mode or a no DRX mode; and
transitioning from no said DRX mode to said DRX mode, wherein the at least one DRX mode comprises a first DRX mode, and wherein in the first DRX mode comprises receiving signaling in first enabled subframes corresponding to a subset of subframes available for downlink, and
receiving data in the first enabled subframes.

2. The method of claim 1, wherein said at least one DRX mode comprises a plurality of DRX modes associated with different subframes usable for sending data, or signaling, or both data and signaling to the wireless network.

3. The method of claim 1, wherein the at least one DRX mode comprises a DRX mode in which no signaling and data is received on a downlink.

4. The method of claim 1, wherein a configuration of T1, T2, R and offset is received from a wireless network, with T1 defining spacing between first enabled subframes for a first DRX mode, T2 defining spacing between second enabled subframes for a second DRX mode, R defining spacing between third enabled subframes for a DRX mode, and said T1-enabled, T2-enabled, and R-enabled subframes are identified by an offset from a reference time.

5. The method of claim 1, further comprising transitioning between an active mode and a continuous packet connectivity (CPC) mode based on signaling, wherein the CPC mode comprises the at least one DRX mode, and wherein the active mode comprises the no DRX mode.

6. The method of claim 1, wherein the at least one DRX mode comprises a second DRX mode, and wherein in the second DRX mode signaling is received in second enabled subframes corresponding to a subset of the first enabled subframes.

7. The method of claim 1, wherein the first enabled subframes are spaced apart at intervals of R subframes, where R is a configurable parameter.

8. The method of claim 4, wherein the T1-enabled, T2-enabled, and R-enabled subframes are aligned in time to reduce rise-over-thermal.

9. An apparatus for discontinuous receiving, comprising:
means for operating in one of at least one discontinuous reception (DRX) mode or a no DRX mode; and
means for transitioning from no said DRX mode to said DRX mode, wherein the at least one DRX mode comprises a first DRX mode, and wherein in the first DRX mode comprises receiving signaling in first enabled subframes corresponding to a subset of subframes available for downlink, and
receiving data in the first enabled subframes.

10. The apparatus of claim 9, wherein said at least one DRX mode comprises a plurality of DRX modes associated with different subframes usable for sending data, or signaling, or both data and signaling to the wireless network.

11. The apparatus of claim 9, wherein the at least one DRX mode comprises a DRX mode in which no signaling and data is received on a downlink.

12. The apparatus of claim 9, further comprising means for receiving a configuration of T1, T2, R and offset from a wireless network, with T1 defining spacing between first enabled subframes for a first DRX mode, T2 defining spacing between second enabled subframes for a second DRX mode, R defining spacing between third enabled subframes for a DRX mode, and said T1-enabled, T2-enabled, and R-enabled subframes are identified by an offset from a reference time.

13. The apparatus of claim 9, further comprising means for transitioning between an active mode and a continuous packet connectivity (CPC) mode based on signaling, wherein the CPC mode comprises the at least one DRX mode, and wherein the active mode comprises the no DRX mode.

14. The apparatus of claim 9, wherein the at least one DRX mode comprises a second DRX mode, and wherein in the second DRX mode signaling is received in second enabled subframes corresponding to a subset of the first enabled subframes.

15. The apparatus of claim 9, wherein the first enabled subframes are spaced apart at intervals of R subframes, where R is a configurable parameter.

16. The apparatus of claim 12, wherein the T1-enabled, T2-enabled, and R-enabled subframes are aligned in time to reduce rise-over-thermal.

17. An apparatus for discontinuous receiving, comprising:
at least one processor adapted to operate in one of at least one discontinuous reception (DRX) mode or a no DRX mode; and
transition from no said DRX mode to said DRX mode; and
a memory coupled to the at least one processor, wherein the at least one DRX mode comprises a first DRX mode, and wherein in the first DRX mode comprises receiving signaling in first enabled subframes corresponding to a subset of subframes available for downlink, and receiving data in the first enabled subframes.

18. The apparatus of claim 17, wherein said at least one DRX mode comprises a plurality of DRX modes associated with different subframes usable for sending data, or signaling, or both data and signaling to the wireless network.

19. The apparatus of claim 17, wherein the at least one DRX mode comprises a DRX mode in which no signaling and data is received on a downlink.

20. The apparatus of claim 17, further adapted to receive a configuration of T1, T2, R and offset from a wireless network, with T1 defining spacing between first enabled subframes for a first DRX mode, T2 defining spacing between second enabled subframes for a second DRX mode, R defining spacing between third enabled subframes for a DRX mode, and said T1-enabled, T2-enabled, and R-enabled subframes are identified by an offset from a reference time.

21. The apparatus of claim 17, further adapted to transition between an active mode and a continuous packet connectivity (CPC) mode based on signaling, wherein the CPC mode comprises the at least one DRX mode, and wherein the active mode comprises the no DRX mode.

22. The apparatus of claim 17, wherein the at least one DRX mode comprises a second DRX mode, and wherein in the second DRX mode signaling is received in second enabled subframes corresponding to a subset of the first enabled subframes.

23. The apparatus of claim 17, wherein the first enabled subframes are spaced apart at intervals of R subframes, where R is a configurable parameter.

24. The apparatus of claim 20, wherein the T1-enabled, T2-enabled, and R-enabled subframes are aligned in time to reduce rise-over-thermal.

* * * * *

UNITED STATES PATENT AND TRADEMARK OFFICE
CERTIFICATE OF CORRECTION

| | | |
|---|---|---|
| PATENT NO. | : 8,098,635 B2 | Page 1 of 1 |
| APPLICATION NO. | : 12/903136 | |
| DATED | : January 17, 2012 | |
| INVENTOR(S) | : Montojo et al. | |

It is certified that error appears in the above-identified patent and that said Letters Patent is hereby corrected as shown below:

Column 17, line 5, claim 1: "no said DRX mode" to read as --said no DRX mode--

Column 17, line 7, claim 1: "in the" to read as --the--

Column 17, line 14, claim 2: "sending" to read as --receiving--

Column 17, line 15, claim 2: "to the wireless network" to read as --from a wireless network--

Column 17, line 19, claim 4: "T1 , T2 ," to read as --T1, T2,--

Column 17, line 46, claim 9: "no said DRX mode" to read as --said no DRX mode--

Column 17, line 48, claim 9: "in the" to read as --the--

Column 17, line 55, claim 10: "sending" to read as --receiving--

Column 17, line 56, claim 10: "to the wireless network" to read as --from a wireless network--

Column 18, line 25, claim 17: "no said DRX mode" to read as --said no DRX mode--

Column 18, line 28, claim 17: "in the" to read as --the--

Column 18, line 34, claim 18: "sending" to read as --receiving--

Column 18, line 35, claim 18: "to the wireless network" to read as --from a wireless network--

Signed and Sealed this
Seventeenth Day of July, 2012

David J. Kappos
*Director of the United States Patent and Trademark Office*